I. N. KEYSER.
VERMIN EXTERMINATOR.
APPLICATION FILED MAR. 9, 1920.

1,352,067.

Patented Sept. 7, 1920.

Witness

Inventor
I. N. Keyser,
By C. C. Hines,
Attorney

UNITED STATES PATENT OFFICE.

ISAAC N. KEYSER, OF URBANA, OHIO.

VERMIN-EXTERMINATOR.

1,352,067. Specification of Letters Patent. Patented Sept. 7, 1920.

Application filed March 9, 1920. Serial No. 364,424.

*To all whom it may concern:*

Be it known that I, ISAAC N. KEYSER, a citizen of the United States, residing at Urbana, in the county of Champaign and State of Ohio, have invented new and useful Improvements in Vermin - Exterminators, of which the following is a specification.

This invention relates to a vermin exterminator of that type embodying a poison-containing receptacle having an opening for the ingress of the animal, through which the animal enters the receptacle in order to obtain access to a food substance or bait impregnated with a poison.

One object of my invention is to provide a receptacle of the character described which is simple and inexpensive of construction and reliable and efficient in action in destroying rats, mice or other similar vermin, while at the same time affording a high measure of safety against the destruction of house pets or other domestic animals.

Another object of the invention is to provide a receptacle which is adapted to be easily and conveniently cleaned, replenished with the destructive agent whenever required, and applied for use to the floor or wall of a building.

The invention consists of the features of construction, combination and arrangement of parts, hereinafter fully described and claimed, reference being had to the accompanying drawings, in which:—

Figure 1:
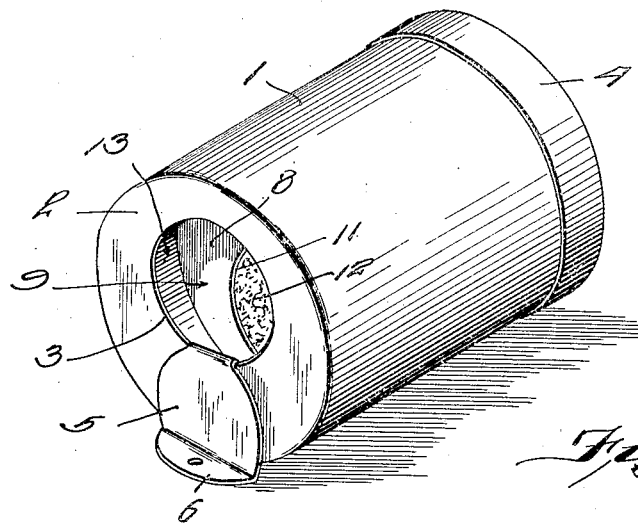
Figure 1 is a perspective view of a vermin exterminator constructed in accordance with my invention.
Figure 2:
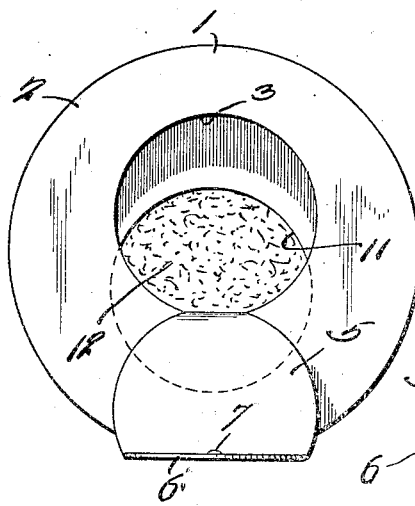
Fig. 2 is a front elevation of the same.

In the practical embodiment of my invention, as herein disclosed, I provide a receptacle 1, of cylindrical or other suitable form, and made of sheet metal or other suitable material. This receptacle is provided at its forward end with a wall 2 having an ingress opening 3, while the opposite or rear end of the receptacle is normally open and adapted to be closed by a removable cover 4.

The ingress opening 3 is of properly restricted size and is arranged preferably eccentric to the axis of the receptacle. In the formation of this opening 3 the metal displaced in producing the same is bent outward to provide a depending bracket member 5 lying on the outer side and parallel with the lower portion of the wall 2, said bracket member having an attaching flange 6 bent at an angle thereto and perforated for the passage of a suitable fastening 7, whereby the receptacle may be secured to a wall, floor or other support. An attaching member is thus provided which is integral with the body of the receptacle and affords a simple means by which the receptacle may be fastened in a desired position for use.

Arranged within the receptacle is a partition 8 comprising a plate of a diameter conforming to the internal diameter of the receptacle and adapted to snugly fit the same. This partition 8 sub-divides the receptacle into two chambers or compartments 9 and 10, and said partition is provided with an opening 11 connecting these compartments with each other. The compartment 9 serves as an entrance chamber, while the compartment 10 forms a storage chamber for the reception of the destroying agent 12. This agent 12 may consist of any suitable food substance or poison destructive to vermin, the charge of bait or food substance being held between the partition 8 and the cover or closure 4.

In charging the receptacle 1 with the bait composition 12, the cover 4 is removed, the food substance applied, and the cover or closure 4 replaced. The partition 8 will thus separate the body of the poisoned food 12 from the entrance chamber or compartment 9, so that an animal attracted by the bait must first enter the compartment 9 through the ingress opening 3 in the wall 2 before getting access to the bait, which is accessible only through the restricted opening 11. As the poisoned food composition is gradually consumed, the animal, in order to gain access thereto, exerts pressure upon the partition 8 which is thus pushed rearwardly by the entering animal as the food composition is gradually consumed, whereby the partition is caused to perform the function of a follower always maintaining the mass of the food composition in compact order until it is fully consumed.

The partition or follower 8 is provided with a forwardly projecting annular flange 13. This flange frictionally engages the wall of the body of the receptacle and thus stably supports and guides the partition, while at the same time setting up a sufficient degree of frictional contact to insure the maintenance of the follower in adjusted position and prevent its displacement by shocks, jars or vibrations. The flange 13 is adapted for engagement with the wall 2 to limit the forward movement of the partition 8, thus preventing the partition from having forward movement beyond a predetermined point. By this means, even when the compartment 10 is fully charged, the partition 8 will be spaced a determined distance from the wall 2, so that the compartment 9 will always be of sufficient size to form a safety zone or receptacle for any of the loosened food composition 12 which may be displaced and fall thereinto through the opening 11. By this means falling of the food composition outward upon the floor will be prevented or reduced to the minimum, with a consequent degree of safety to domestic pets or animals. The opening 3 is preferably arranged so that its axis lies above the axis of the receptacle, while the opening 11 is so arranged that its axis lies below the axis of the receptacle, said openings thus being so disposed as to lie out of alinement with or mutually eccentric to each other. By this construction the center of the opening 11 lies close to the base of the chamber 9, allowing vermin entering said chamber to have ready access to the poisoned food compound 12, while the opening 3 will lie at a higher elevation, increasing the depth of the lower front wall of the chamber 9, so that a considerable amount of the poisoned food may fall into the base of the compartment 9 without passing out through the opening 3 and falling outside of the receptacle. The eccentric arrangement of the openings 3 and 11 renders it difficult for cats, dogs and other pets or domestic animals to gain access to the food composition 12, but their entrance to the receptacle is also prevented by the restricted size of the opening 3, and the spacing of the partition 8 from the wall 2 further renders it difficult for a domestic animal of larger size than rodents or like vermin from reaching the food composition 12, thus insuring a high degree of safety against the poisoning of all domestic pets or animals.

Figure 3:
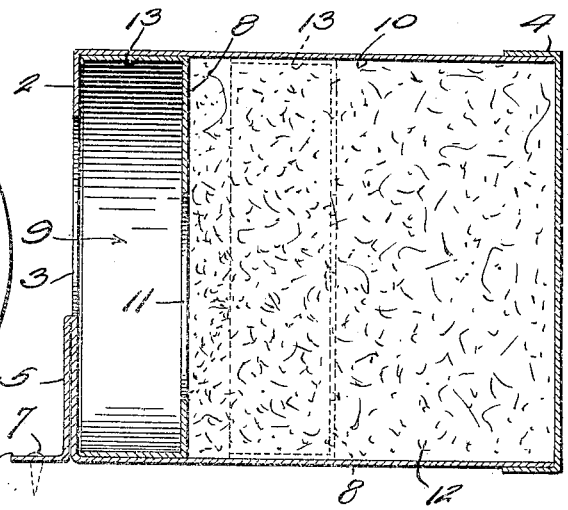
Fig. 3 is a vertical longitudinal section through the charged receptacle, showing in full and dotted lines the follower or partition in different positions.

As stated, and as indicated in dotted lines in Fig. 3, the partition or follower 8 is movable backwardly under pressure of successive rodents entering the compartment 9, and hence is automatically adjustable to keep the body of poisonous food compound 12 in compact order until the charge of the food compound is entirely exhausted. When this occurs the cover 4 may be removed, the interior of the receptacle 1 cleaned and said receptacle replenished with a fresh supply of the poisonous food composition, after which upon the replacement of the cover 4 the receptacle will be in condition for further and repeated use. It will be evident from the foregoing description that my invention provides a vermin exterminator of simple construction, which may be fastened for use in a convenient position upon the wall, floor or other suitable support, and which will be effective in action in destroying vermin without liability of poisoning domestic animals.

Having thus fully described my invention, I claim:—

1. A vermin exterminator comprising a receptacle having an ingress opening in one of its walls, and a partition movably mounted in the receptacle for adjustment toward and from the ingress opening, said partition sub-dividing the interior of said receptacle into a poison-containing compartment and a non-poison-containing compartment, the latter being in direct communication with said ingress opening, said partition having an opening connecting said compartments, the aforesaid openings being arranged out of axial alinement with each other.

2. A vermin exterminator comprising a receptacle having an ingress opening, a partition consisting of a disk disposed within the receptacle and coextensive in diameter therewith, said disk being arranged in spaced relation to said ingress opening and adjustable toward and from the same and sub-dividing said receptacle to form an entrance to a safety zone compartment and a bait compartment, said partition being provided with an opening establishing communication between said compartments, the two openings being out of alinement with each other.

3. A vermin exterminator comprising a receptacle having an ingress opening, a partition consisting of a disk coextensive in diameter with the receptacle and disposed therein in spaced relation to said ingress opening and sub-dividing the interior of the receptacle into entrance and bait containing compartments, said partition being adjustable with relation to the ingress opening and having an opening establishing communication between said compartments, the said openings being arranged eccentric to the axis of the receptacle and mutually eccentric to each other, and a flange upon the disk to limit its forward adjustment with relation to the ingress opening.

4. A vermin exterminator comprising a receptacle having an ingress opening, a partition adjustably mounted within said receptacle and sub-dividing the interior thereof into entrance and bait containing compartments, said partition having an opening establishing communication between said compartments, said opening being arranged out of axial alinement with the ingress opening, and a projection from said partition holding the same in spaced relation to the ingress opening.

5. A vermin exterminator comprising a receptacle having a front end wall provided with an ingress opening and normally open at its rear end, a removable cover for the rear end of the receptacle, a partition adjustable longitudinally of said receptacle, said partition separating the interior of the receptacle into entrance and bait containing compartments and having an opening therein establishing communication between said compartments, said openings being arranged out of alinement with each other and eccentric to the axis of the receptacle, and a flange projecting forwardly from the partition for contact with the front end wall of the receptacle to limit the forward motion of said partition.

6. A vermin exterminator comprising a receptacle having an ingress opening in one of its walls, a partition longitudinally adjustable in said receptacle and forming entrance and poison containing compartments, said partition having an opening establishing communication between said compartments, said ingress opening having its axis arranged above the longitudinal axis of the receptacle and said opening in the partition having its axis arranged below the longitudinal axis of the receptacle, and spacing means for limiting the movement of the partition toward and with relation to the first-named wall.

7. A vermin exterminator having an ingress opening, a partition therein forming entrance and poison containing compartments, said partition having an opening connecting said compartments, and means forming an integral part of the receptacle whereby said receptacle may be fastened to a support.

8. A vermin exterminator having an ingress opening, and a fastening bracket for securing the receptacle to a support, said bracket constituting an integral part of the receptacle and being formed by a portion of the metal displaced to produce said ingress opening.

In testimony whereof I affix my signature.

ISAAC N. KEYSER.